(12) United States Patent
Rennuit et al.

(10) Patent No.: US 11,219,998 B2
(45) Date of Patent: Jan. 11, 2022

(54) METHOD FOR TREATING A SURFACE AND CORRESPONDING AUTOMATED DEVICE

(71) Applicant: LES COMPANIONS, Lille (FR)

(72) Inventors: Antoine Rennuit, Wasquehal (FR); David Busson, Lille (FR)

(73) Assignee: Les Companions, Lille (FR)

( * ) Notice: Subject to any disclaimer, the term of this patent is extended or adjusted under 35 U.S.C. 154(b) by 288 days.

(21) Appl. No.: 16/096,744

(22) PCT Filed: Apr. 28, 2017

(86) PCT No.: PCT/FR2017/051019
§ 371 (c)(1),
(2) Date: Oct. 26, 2018

(87) PCT Pub. No.: WO2017/187106
PCT Pub. Date: Nov. 2, 2017

(65) Prior Publication Data
US 2019/0118370 A1    Apr. 25, 2019

(30) Foreign Application Priority Data
Apr. 29, 2016   (FR) ..................................... 16 53916

(51) Int. Cl.
*B05B 12/00* (2018.01)
*B05D 1/40* (2006.01)
(Continued)

(52) U.S. Cl.
CPC .............. *B25J 5/007* (2013.01); *B05B 12/00* (2013.01); *B05B 13/005* (2013.01); *B05B 13/0431* (2013.01); *B05D 1/40* (2013.01); *B25J 5/04* (2013.01); *B25J 11/005* (2013.01); *B25J 11/0075* (2013.01); *B25J 13/085* (2013.01); *B25J 13/086* (2013.01); *B25J 13/089* (2013.01);
(Continued)

(58) Field of Classification Search
None
See application file for complete search history.

(56) References Cited

U.S. PATENT DOCUMENTS

2016/0052296 A1* 2/2016 Grimes ............... B05B 13/0405
                                                              347/110

FOREIGN PATENT DOCUMENTS

EP    2090506 A1    8/2009
EP    2394785 A1    12/2011
(Continued)

*Primary Examiner* — Michael P. Rodriguez
(74) *Attorney, Agent, or Firm* — Calfee, Halter & Griswold LLP

(57) ABSTRACT

The present invention provides a treatment method for treating a surface for treatment by means of an automaton (1) comprising: a base (2) configured to move over ground; a platform (6) mounted on the base and configured to move, at least in part, perpendicularly to the base; and treatment means (10) mounted on the platform and including a movable end (12) configured to treat a given area; the method comprising: a) subdividing the surface for treatment into subdivisions of area less than or equal to the given area; b) treating the surface of each subdivision by controlling movements of the treatment means (10); and c) changing subdivision by moving the platform (6) and/or by moving the base (2) over the ground. The invention also provides an automaton for performing the above method.

14 Claims, 2 Drawing Sheets

(51) Int. Cl.
*B25J 5/00* (2006.01)
*B05B 13/00* (2006.01)
*B05B 13/04* (2006.01)
*B25J 11/00* (2006.01)
*B25J 13/08* (2006.01)
*B25J 19/02* (2006.01)
*B25J 19/06* (2006.01)
*B25J 5/04* (2006.01)

(52) U.S. Cl.
CPC ........... *B25J 19/022* (2013.01); *B25J 19/023* (2013.01); *B25J 19/06* (2013.01)

(56) References Cited

FOREIGN PATENT DOCUMENTS

| | | |
|---|---|---|
| FR | 2902038 A1 | 12/2007 |
| JP | 20060320825 A | 11/2006 |

\* cited by examiner

METHOD FOR TREATING A SURFACE AND CORRESPONDING AUTOMATED DEVICE

BACKGROUND

The present disclosure relates to a method of treating a surface, and to a corresponding automaton. More particularly, the present disclosure relates to a method of painting a surface by means of an assistant automaton.

Robots already exist for treating a surface, e.g. for painting it or sanding it. Such robots are used in particular in the automobile industry for painting vehicle bodywork. Such robots are independent and they are programmed to perform a series of operations without oversight from an operator: they then replace one or more people by performing the tasks that have previously been programmed in the computer controlling the robot.

Nevertheless, such robot painters, just like other robots used on assembly lines, are stationary on the ground and only the arm holding the tool moves: their range of action is thus geographically limited. Furthermore, in order to avoid accidents with any people who might be in the proximity of robots, robots are generally surrounded by a safety zone in which they are to work and that should not be entered by individuals.

Robots also exist in the building industry. Such robots are used in particular for working in locations that are difficult for individuals to access, and possibly even prohibited. This applies for example when the surface for treatment comprises a high ceiling or is situated in a zone where there is a danger of radiation. An example of a robot suitable for acting under such conditions is described in particular in application FR 2 902 038.

It can be seen that the robot is then directly controlled by an operator in order to treat the surface, with the robot taking the place of the operator and being under the operator's control. Thus, such robots are not independent and they need to be controlled continuously by an operator: the use of such a robot then serves to facilitate the tasks of the operator, but continues to require the operator to be present, whether beside the robot or remotely. The robot then does not replace the operator who is to perform the operation, but acts rather as a tool that remains under the control of the operator and that does not act on its own.

Thus, the robot does not enable work to be performed instead of and replacing an individual, but requires constant supervision. In particular, the robot can treat a given surface only as a result of instructions given by the operator while said surface is being treated so as to adapt the actions being carried out by the robot in real time.

SUMMARY

The present disclosure seeks to resolve the various above-mentioned technical problems. In particular, the present disclosure seeks to provide a method of treating a surface by means of an automaton, and also the corresponding automaton, the method enabling said automaton to treat said surface in autonomous and effective manner. Furthermore, the present disclosure also seeks to provide a method of treating a surface that enables an automaton to operate on its own, and also in the presence of people around it.

Thus, in an aspect, there is provided a treatment method for treating a surface for treatment by means of an automaton comprising:
  a base configured to move over ground;
  a platform mounted on the base and configured to move, at least in part, perpendicularly to the base, e.g. vertically; and
  treatment means, e.g. an arm, mounted on the platform and including a movable end configured to treat a given area;
  the method comprising:
  a) subdividing the surface for treatment into subdivisions of area less than or equal to the given area;
  b) treating the surface of each subdivision by controlling movements of the treatment means; and
  c) changing subdivision by moving the platform, e.g. in vertical translation, and/or by moving the base over the ground.

The method makes it possible to plan the treatment of the surface for treatment. More particularly, the method takes account of the structure of the automaton while it is treating the surface treatment in order to subdivide the surface for treatment. Thus, the automaton has a base that moves over ground, i.e. substantially horizontally, and a platform that moves perpendicularly to the base, i.e. substantially vertically, and the method provides for the surface for treatment to be split up into contiguous subdivisions. The boundaries between neighboring subdivisions may in particular be vertical or horizontal, so that going from one subdivision to another may take place either by moving the base horizontally or by moving the platform vertically. Each subdivision corresponds to a zone that can be treated by moving only the treatment means on the platform. The method is thus selected so as to optimize the movements of the automaton while it is treating the surface. Furthermore, the method enables the automaton to move over the ground, so as to enable it to operate in any location without having a limited range of action, while still remaining predictable for people in its proximity by virtue of working sequentially over subdivisions.

More particularly, the automaton treats the surface for treatment in portions, and moves from subdivision to subdivision: it is thus easy, in particular for people working in the proximity of the automaton, to anticipate the movements it is going to perform, and thus to act accordingly: for example, by avoiding treating a surface close to the subdivision that is about to be treated by the automaton, for example. The automaton can then work cooperatively with people working around it: the automaton performs tasks that are repetitive and that require little skill, while professionals perform work that is more specific. Planning the work that is to be performed by the automaton thus facilitates simultaneous work by people in its proximity.

An automaton is thus obtained that can work in autonomous manner without requiring continuous supervision by a person. This serves to reduce the time an operator needs to spend acting on the automaton, and the operator can in turn perform treatment on the surface at the same time as the automaton, e.g. by performing tasks that require particular skills or know-how such as treating specific surfaces such as the outlines of electricity outlets, behind pipes, staircases, . . . .

Preferably, the movable end of the treatment means is configured to treat the surface of each subdivision by moving parallel to the surface of the subdivision for treatment, e.g. in a vertical plane. The movable end of the treatment means act like the hand of a person treating the surface. When the treatment involves spraying (paint or a plaster coating), the end is configured either to remain substantially always at the same distance from the surface for treatment, so that the treatment performed by the movable end is uniform over the entire surface of the subdivision, or else to change the distance between itself and the surface for treatment, in order to adapt the treatment to varying conditions. When the treatment involves contact, e.g. sanding or painting with a paintbrush or a pad, the end is configured either always to exert substantially the same force on the surface for treatment, so that the treatment performed by the movable end is uniform over the entire surface of the subdivision, or else to modify the force exerted on the surface so as to adapt the treatment to varying conditions.

Preferably, between steps a) and b), the method also includes a step a') of determining a chronological order for treating said subdivisions. A step of determining the order in which subdivisions are treated makes it possible to optimize the movements of the automaton and thus the time required for treating the surface. Furthermore, the automaton can thus limit its movements over the ground, in particular when it is working beside people, so as to avoid any contact or interference with their work.

Preferably, during step b), the platform and the base remain stationary, and/or during step c), the treatment means remain stationary. The movements of the automaton are deliberately programmed to be performed separately from one another, in other words: either it is the platform and/or the base that moves, or else it is the treatment means, but never both at the same time. This makes it easier for any people who might be working around the automaton to predict and anticipate its movements, so as to act accordingly. Furthermore, the surface treatment method performed by the automaton also makes it possible to decorrelate the movements of the automaton, and indeed to facilitate decorrelating them.

Preferably, in step b), the treatment means are moved in a vertical and/or horizontal direction, and/or they are steered by turning about at least one axis parallel to the surface for treatment, while treating the surface. As mentioned above, the treatment means perform work that is traditionally performed by the hand of a person: provision is thus made to imitate as much as possible the movements of a hand so as to reproduce as effectively as possible the technique performed by a person.

Preferably, at least one of the subdivisions of the surface for treatment has a peripheral outline defining an inside area, and in step b), the treatment means are moved so as to begin by treating the peripheral outline of said subdivision, followed by treating its inside area. Such an implementation can be used in particular while painting: specifically, a picking out method provides for applying paint to the margins of the area that is to be painted prior to painting the inside of the area. The automaton can thus use the same technique, for each subdivision, in order to obtain a result that is similar.

Preferably, during step b), the position of the treatment means relative to the surface for treatment is determined and monitored. The method of monitoring the automaton may thus include controlling and managing various sensors serving to verify that the automaton is treating the surface correctly. Such monitoring may be performed in particular concerning the distance between the treatment means and the surface for treatment.

Preferably, the treatment of a surface for treatment is painting said surface for treatment, sanding said surface for treatment, and/or spraying a plaster coating on said surface for treatment.

Preferably, the surface for treatment is an inside surface of a building. In particular, the surface for treatment may be an inside surface of a house, of an apartment building, or of an office building. In this example, the treatment method concerns surfaces that are normally treated by operators, since they involve constraints concerning access (small size to pass through doorways or via the stairs in the building, maximum weight limited by the structure of the building), constraints concerning surface areas (surfaces inside a building are generally smaller and easier for operators to access than outside surfaces), and constraints concerning electrical power supply (no local electrical power supply in a building while it is under construction) that normally lead to the treatment of the surfaces being given to operators to perform rather than to automatons.

Preferably, the surface for treatment may also be an outside surface of a building. Thus, the surface for treatment may be a facade of a building, or indeed the surface of a terrace or a balcony.

In particular, the surface treatment may be treatment that is performed in industrialized and automated manner. Under such circumstances, the treatment may comprise a step of searching for and/or identifying each new surface for treatment, prior to performing the treatment step. Thus, the automaton may be configured to identify a new surface for treatment on a manufacturing line in which surfaces for treatment move in translation past the automaton, or else it may be configured itself to move through a static manufacturing line from one surface for treatment to another. The surfaces for treatment may: either all be identical, or of shape known to the automaton and identifiable in a database of surfaces for treatment, or else of arbitrary shapes but of characteristics (in particular outlines) that can be identified by the automaton.

Preferably, the surface for treatment comprises one or more walls, one or more facades, one or more ceilings, and/or one or more floors. More precisely, the work that can be carried out by the automaton is not limited to a single continuous surface, but may involve different identified surfaces that are distinct from one another.

In another aspect, the disclosure also provides an automaton for treating a surface for treatment, the automaton comprising:
 a base configured to move over ground;
 a platform mounted on the base and configured to move, at least in part, perpendicularly to the base, e.g. vertically; and
 treatment means, e.g. an arm, mounted on the platform and including a movable end configured to treat a given area.

In particular, the automaton also includes an electronic control unit configured to:
 a) subdivide the surface for treatment into subdivisions of area less than or equal to the given area;
 b) treat the surface of each subdivision by controlling movements of the treatment means; and
 c) change subdivision by moving the platform, e.g. vertically, and/or by moving the base over the ground.

Preferably, the automaton is configured to pass through openings, and in particular doors, in a building, such as a house, an apartment building, or an office building. For example, the automaton may present a height that is less than or equal to 2.5 meters (m), preferably less than or equal to 2 m. The automaton may also present a width that is less than or equal to 2 m, preferably less than or equal to 1 m. The automaton may also present a length that is less than or equal to 4 m, preferably less than or equal to 2 m. Furthermore, the automaton may present a weight that is less than or equal to 500 kilograms (kg), preferably less than or equal to 250 kg. An automaton is thus obtained that is compact and that can move inside a building: i.e. it can go through doors and can use an elevator.

Furthermore, such characteristics concerning size and weight also enable the automaton to be used in a wide variety of different surroundings, while still remaining operational, in particular because it is easy to handle and it occupies little space.

Preferably, the automaton is configured to move outdoors, e.g. on public ways, such as sidewalks.

Alternatively, the automaton may be configured to move in industrial surroundings such as a manufacturing line.

Preferably, the automaton also includes one or more sensors for locating itself in three dimensions and relative to the surface for treatment, e.g. ultrasound sensors, laser sensors, travel time sensors, video systems, or indeed sensors co-operating with beacons defining at least a portion of the surface for treatment. The purpose of the sensors is to facilitate positioning of the automaton in its surroundings so as to facilitate identifying surfaces for treatment and also so as to define said surfaces in three dimensions.

The automaton may thus include an optical locating system, e.g. one or more cameras such as cameras positioned stereoscopically, enabling the automaton to position itself in three dimensions in its surroundings. This ensures that the movements and operations performed by the automaton are performed with precision.

Preferably, the automaton also includes presence sensors and is configured to limit, or even avoid, any contacts with potential obstacles, e.g. with people. Such sensors serve in particular to preserve the physical integrity of people who might be working or who might be located in the proximity of the automaton. Thus, by virtue of the various sensors, the automaton is configured to detect the presence of such people and to act appropriately in order to avoid injuring them or impeding them. The automaton thus becomes cooperative, since it can assist people in their work, while performing its own work in their proximity. The term "cooperative" is used of an automaton that is capable of working in the proximity of individuals without requiring a barrier.

Preferably, the automaton also has an interface configured to enable instructions to be input by an operator and/or to display information about the operation of the automaton. Such an interface serves in particular to control the automaton, and to give it instructions. In particular, insofar as the automaton is autonomous, the instructions are given to it initially before allowing it to perform its programmed tasks on its own.

Preferably, one of the surfaces inside the room is the surface for treatment.

Preferably, the automaton is configured to move inside the room.

BRIEF DESCRIPTION OF THE DRAWINGS

Embodiments of the disclosure and its advantages can be better understood on reading the following detailed description of a particular embodiment given by way of non-limiting example and shown in the accompanying drawings, in which.

DETAILED DESCRIPTION

Figure 1:
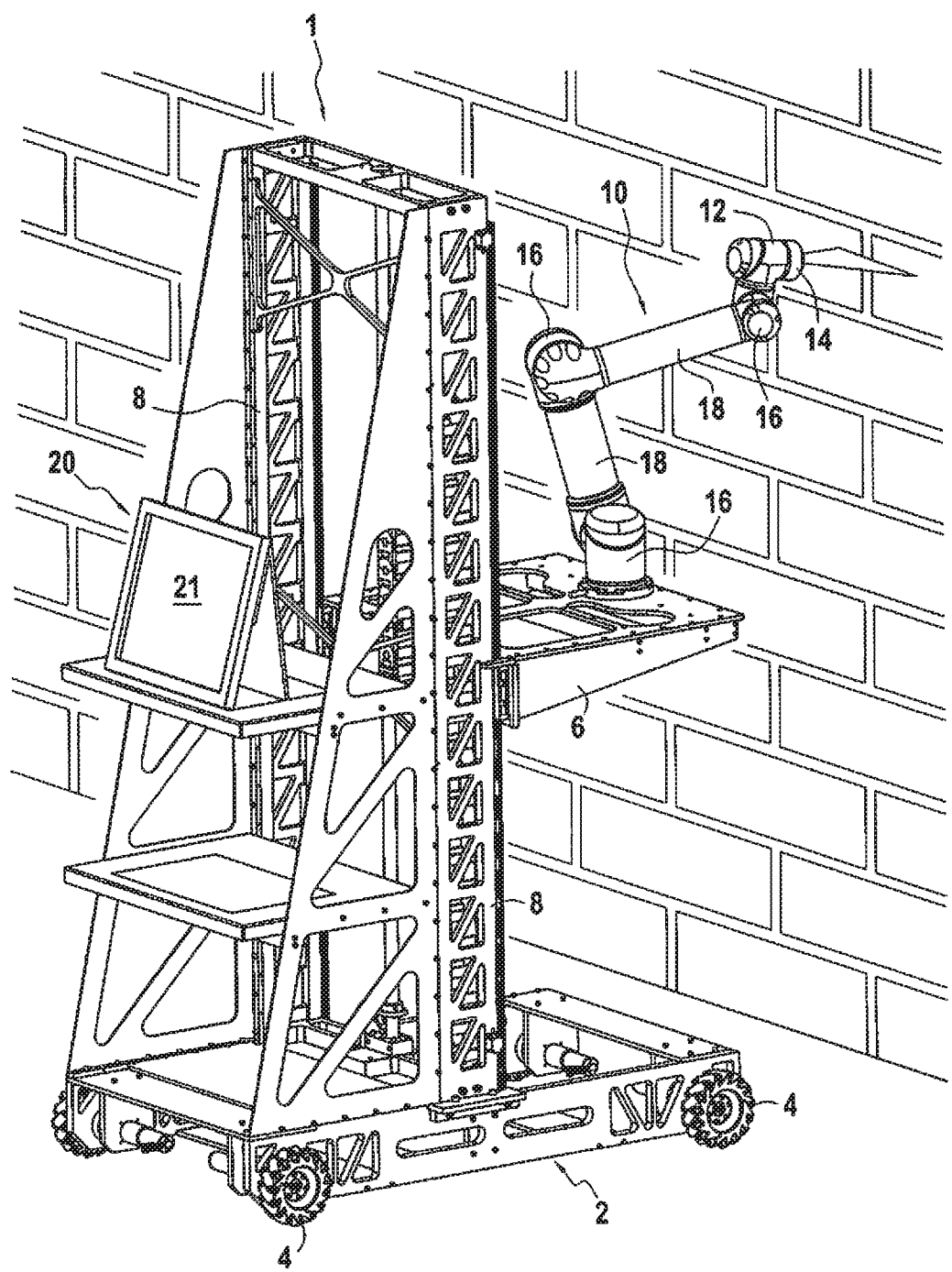
FIG. 1 is a diagrammatic perspective view of an automaton of the present disclosure.

FIG. 1 is a diagrammatic perspective view of an automaton of the present disclosure for treating a surface that is to be treated. The automaton 1 thus comprises a base 2 that enables the automaton to move over the ground and that comprises: movement means, specifically wheels 4 advantageously configured so as to avoid damaging the ground, e.g. being made of or covered in a flexible material such as an elastic material, together with means for driving the wheels, e.g. a motor (not shown). The base 2 constitutes a chassis for the automaton 1 and supports all of the elements of the automaton 1 as described below.

The automaton 1 also has a platform 6. The platform 6 is mounted on the base 2, e.g. via two rails 8 that are mounted substantially perpendicularly on the base 2. The platform 6 is configured to move along the rails 8, i.e. substantially perpendicularly to the base 2 by using drive means (not shown), e.g. a motor. A platform 6 is thus obtained that is capable of moving vertically, for example, in order to reach various different heights of the surface to be treated.

The automaton 1 also has treatment means, specifically an arm 10. The arm 10 is mounted on the platform 6 and comprises firstly a treatment end 12 where a tool is mounted for treating the surface 14, specifically a paint spray nozzle 14, and secondly one or more hinges 16 connecting together one or more arm portions 18. The hinges 16 enable the treatment tool 14 to be moved and steered as desired over all of a surface of given area. The area depends in particular on the lengths of the arm portions 18 and on the amplitudes of the hinges 16. Furthermore, the arm 10 also enables the treatment tool 14 to be moved parallel to the surface for treatment so as to obtain a uniform treatment result.

Finally, the automaton 1 includes a control unit 20. The control unit 20 may be mounted on the base 2 of the automaton 1, or it may be situated remotely at a distance therefrom, or indeed a portion of it may be mounted on the base 2 and a portion may be remote. The control unit 20 may in particular include a screen 21. The control unit 20 serves to control the various means of the automaton 1, in particular the means for driving the base 2, the platform 6, and the arm 10. The control signals are determined in particular by the control unit 20 as a function of instructions and data communicated thereto.

More precisely, the electronic control unit 20 is configured to plan treatment of the surface for treatment, while taking account of the structure of the automaton 1 and while facilitating the work of individuals in the proximity of the automaton 1.

Thus, the control unit 20 is configured initially to subdivide the surface for treatment into subdivisions of area that is less than or equal to a given area. In other words, the surface for treatment is subdivided into portions that can be treated individually solely by movement of the arm, while the platform 6 and the base 2 remain stationary. Thereafter, the control unit is configured to treat the surface in each subdivision by controlling movements of the arm 10. Once the subdivision has been treated, the electronic control unit 20 then causes the subdivision to be changed by moving the platform 6 vertically and/or by driving the base 2 over the ground.

The automaton 1 thus works by subdivisions or "cells", each subdivision corresponding to a surface area that can be treated solely by movements of the arm 10 of the automaton 1. Thereafter, the automaton 1 moves from subdivision to subdivision, by moving the platform 6 and/or the base 2.

Figure 2:
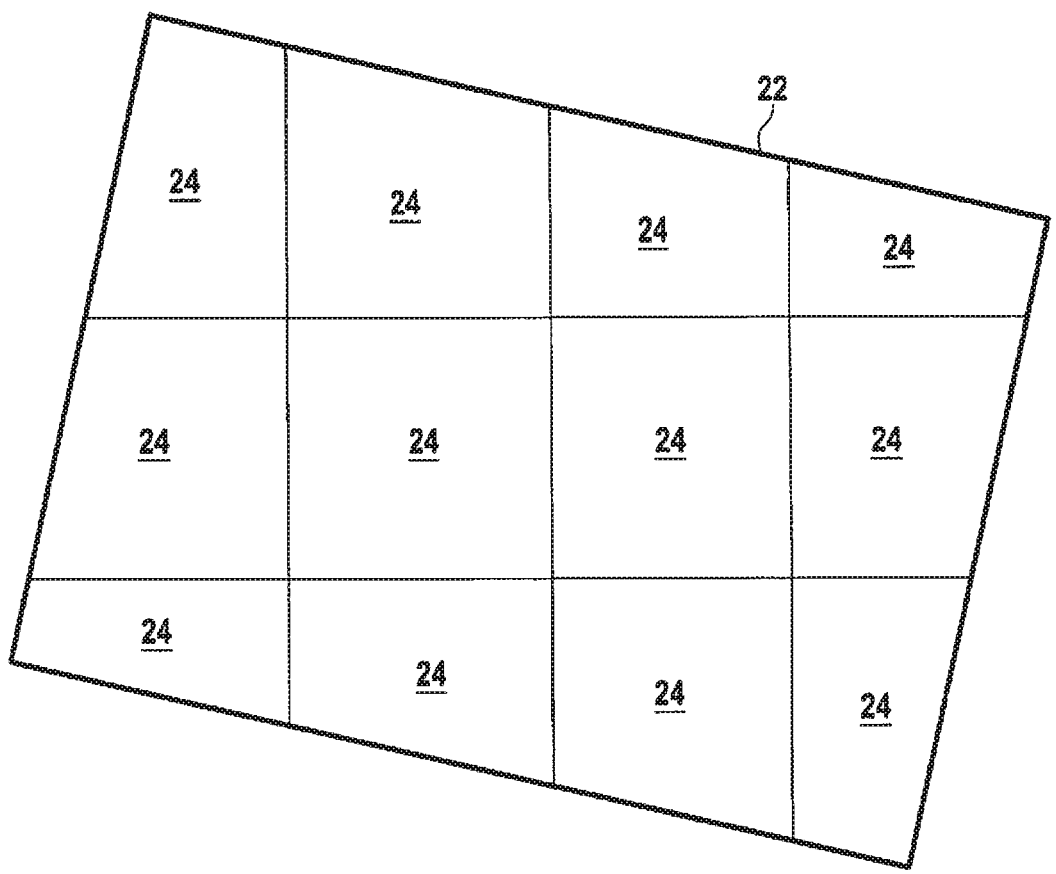
FIG. 2 shows an example of splitting up a surface for treatment into subdivisions by means of the method of the disclosure.

FIG. 2 shows an example of planning the work that is to be performed in order to treat an entire surface for treatment 22. More precisely, although the surface for treatment 22 is not a regular surface, it is considered by the electronic processor unit 20 as comprising a set of subdivisions 24 of areas that are not equal to one another, given the irregularity of the surface for treatment 22.

The subdivisions 24 are obtained by splitting the surface for treatment 22 into a regular rectangular grid with lines that correspond to movements of the platform 6 and of the base 2, specifically vertical lines and horizontal lines.

Once the surface for treatment 22 has been split up by the control unit 20, it can then control the automaton 1 to treat said various subdivisions 24 in succession. Preferably, all of the subdivisions 24 that correspond to the same position for the base 2, i.e. requiring movements only of the arm 10 and of the platform 6 are treated in succession. Thereafter, the base 2 is moved to another position in order to treat in succession all of the corresponding subdivisions 24, and so on. This limits movements over the ground of the automaton 1, thereby facilitating work of the automaton 1 when individuals are in its proximity.

Within each subdivision 24, the treatment applied by the automaton 1 can likewise be planned, in particular so as to achieve a rendering that is close to that which would be provided by a professional. For example, when the treatment involves painting, the control unit 20 may be configured to begin the treatment at one edge or outline of the surface for treatment 22: such treatment is applied only when the subdivision in question is positioned at the edge of the surface for treatment 22 and is not relevant if the subdivision in question is entirely surrounded by other subdivisions 24. Such a method corresponds to "picking out", a technique which consists in beginning by working on the outlines of the surface before working on its center.

Once the outline has been done, the control unit 20 can then control the arm 10 so as to treat the remainder of the area of the subdivision 24, i.e. the inside of the subdivision 24. To do this work, the control unit 20 may in particular provide for moving the arm 10 within a horizontal or vertical grid, i.e. treating the inside of the subdivision 24 by following certain lines of the outline of said subdivision 24 (horizontal or vertical outlines).

Likewise, when the subdivision 24 includes a particular element, such as a switch or an electricity outlet, the same technique can be used: the control unit 20 may be configured to perform the treatment around the outline of the particular element, prior to performing the treatment between the particular element and the outline of the subdivision 24.

Once all of the subdivisions 24 have been treated, the automaton 1 can then stop. In the example described above, it should be observed that the surface for treatment 22 is a single surface. Nevertheless, the work of the automaton 1 of the disclosure is not limited to such single surfaces, and it can treat a surface for treatment that comprises a plurality of distinct portions that are separated from one another. Under such circumstances, each portion of the surface for treatment is worked in the manner described above, i.e. specifically it is subdivided into subdivisions that are worked in succession. When a portion is finished, the control unit 20 controls the base 2 and/or the platform 6 so as to move to another portion of the surface for treatment that has not been treated.

In practice, such a movement may take place firstly by giving each distinct portion of the surface for treatment a specific working reference frame used by the automaton 1 for treating said distinct portion of the surface, and secondly by positioning the various specific working reference frames relative to one another in a single overall reference frame so as to enable the automaton 1 to move from one distinct portion of the surface for treatment to another distinct portion of the surface for treatment. For example, the various portions of the surface for treatment may be two walls of a room, e.g. two contiguous walls that present an angle relative to each other, or indeed two parallel walls that are spaced apart and face each other. In either situation, on passing from one portion of the surface to another, the automaton 1 is obliged to re-orient itself relative to the portion of the surface for treatment, prior to beginning treatment of said portion of the surface.

The control unit 20 may also enable an operator to specify the tasks that are to be performed together with their parameters, and also to take cognizance of various status messages or warnings detected by the control unit 20. Thus, the control unit 20 may enable the operator to specify: treatment parameters, e.g. concerning sanding (speed, force, . . . ) or painting (number of coats to be applied, type of paint, quantity of paint, pattern, interleaving of coats, overlapping two contiguous passes, . . . ); the various zones of the surface for treatment, in particular when the treatment parameters are not to be uniform over the entire surface for treatment, but need to change in compliance with determined data.

The control unit 20 may also serve to define the surface for treatment, and in particular to specify its position in three dimensions so that the automaton 1 can identify it and outline it.

In order to enable the automaton 1 to locate itself and move in three dimensions so as to treat the various surfaces, it may include sensors. The sensors may involve various different technologies depending on the amplitudes and/or the accuracies of the distances involved. Thus, the automaton 1 may have two distance sensors, e.g. ultrasound sensors, that are mounted in the treatment plane of the arm 10 and that serve to determine firstly the distance between the surface for treatment and the automaton 1, and secondly the angle between the axis of the automaton 1 and the surface for treatment. By means of these sensors, it is thus possible to ensure that the arm 10 does indeed perform the treatment at the proper distance from the surface for treatment, and does so while moving parallel thereto.

Alternatively, when the treatment requires contact with the surface for treatment, e.g. sanding, the distance to the surface for treatment and possibly also the angle between the axis of the automaton 1 and the surface for treatment, may be determined directly by the treatment tool, using internal resistance sensors that are used for monitoring the force that is applied to the surface for treatment.

The automaton 1 may also have travel time sensors, e.g. a laser sensor, for monitoring the position of the automaton 1 in its surroundings. For this purpose, beacons may also be positioned at various locations that are identified by the automaton 1, so as to guarantee that it is indeed facing the surface portion for treatment. Such sensors also make it possible to ensure that the movements of the base 2 take place parallel to the surface for treatment, so that the junctions between the various subdivisions 24 coincide.

Alternatively, in addition to the sensors or as a replacement for the sensors, it is also possible to provide one or more cameras enabling the automaton 1 to locate its position in its surroundings in three dimensions. Thus, two cameras that are stereoscopically positioned can enable the control unit 20 to locate itself in three dimensions by determining the distance and the angle between the automaton 1 and surfaces for treatment or surfaces defining the surroundings in which it moves. This may also enable the automaton 1 to move from one surface portion for treatment to another, when these portions are distinct and separate from each other, as described above.

Under all circumstances, a prior step of identifying the surface for treatment in surroundings that can be detected by the automaton 1, and also of calibrating the initial position of the automaton 1 in its surroundings may be necessary in order to perform the locating and positioning steps while treating the surface for treatment.

Finally, the automaton 1 may also have presence sensors serving to ensure that the automaton 1 can work in the proximity of individuals without colliding with them or injuring them. For example, the automaton 1 may have optical sensors forming a barrier between the zone in which the automaton 1 moves and more particularly the zone in which the platform 6 and the arm 10 moves, and the remainder of the surroundings. Thus, if an object is detected intruding into said movement zone, control of the platform 6 and of the arm 10 may be interrupted in order to be certain to avoid injuring a person or to avoid damaging the automaton 1. In addition, or in the alternative, the control unit 20 may monitor the control of the various movement means of the automaton 1, e.g. involving the base 2 or the platform 6, in order to detect an obstruction, if any, to a movement control signal. Under such circumstances, the control signal may be interrupted, or even reversed, and the automaton 1 may wait on standby until a person has come to verify the reason for the obstruction. This ensures that the automaton 1 can indeed move among individuals without running the risk of injuring them.

Figure 3:
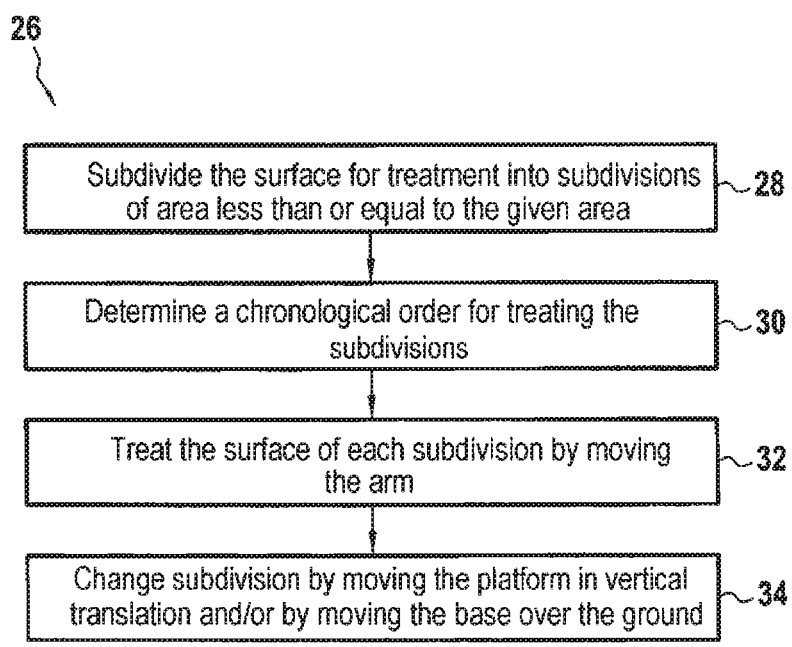
FIG. 3 is a flow chart of an implementation of the method of the disclosure for processing a surface.

FIG. 3 is a flow chart showing an example method 26 for treating a surface for treatment by the automaton 1 as described above. The method 26 begins with a first step 28 in which the surface for treatment is subdivided into subdivisions of area that is less than or equal to the given area. Thereafter, in a second step 30, a chronological order is determined for treating said subdivisions. In step 32, the surface of each subdivision is treated by moving the arm of the automaton, and in step 34, the subdivision is changed by moving the platform vertically in translation and/or by moving the base over the ground.

Thus, by means of embodiments of the disclosure, it becomes possible to use an automaton to treat a surface for treatment while still enabling individuals to act in the proximity of the automaton. In particular, even though the automaton is autonomous, its movements are designed to limit problems with people working in its proximity. The automaton can thus act as an assistant within a worksite, in particular in order to perform the most repetitive of tasks that do not require particular skills. In particular, it can perform painting treatments, e.g. by spraying paint onto the surface, or indeed sanding, e.g. by rotating abrasion means over the surface for treatment, or indeed applying a plaster coating, e.g. by spraying.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Notably, although some features, concepts or aspects of the inventions may be described herein as being a preferred or advantageous arrangement or method, such description is not intended to suggest that such feature is required or necessary unless expressly so stated.

The invention claimed is:

1. A treatment method for treating a surface for treatment by an automaton comprising:
   a base configured to move over ground;
   a platform mounted on the base and configured to move, at least in part, perpendicularly to the base; and
   a treatment device mounted on the platform and including a movable end configured to treat a given area;
   the method comprising:
   a) subdividing the surface for treatment into subdivisions of area less than or equal to the given area, the subdivisions being obtained by splitting up the surface for treatment with a regular rectangular grid with lines corresponding to movements of the platform and of the base;
   a') determining a chronological order for treating said subdivisions;
   b) treating the surface of each subdivision by controlling movements of the treatment device; and
   c) changing subdivision by moving the platform and/or by moving the base over the ground,
   wherein the base of the automaton comprises movement means to move on the ground, and
   wherein the automaton also comprises at least one sensor so as to monitor the position of the automaton in its surroundings.

2. The treatment method according to claim 1, wherein the movable end of the treatment device is configured to treat the surface of each subdivision by moving parallel to the surface of the subdivision for treatment.

3. The treatment method according to claim 1, wherein, during step b), the platform and the base remain stationary, and/or wherein, during step c), the treatment device remain stationary.

4. The treatment method according to claim 1, wherein, in step b), the treatment device is moved in a vertical and/or horizontal direction, and/or steered by turning about at least one axis parallel to the surface for treatment, while treating the surface.

5. The treatment method according to claim 1, wherein at least one of the subdivisions of the surface for treatment has a peripheral outline defining an inside area, and wherein, in step b), the treatment device is moved so as to begin by treating the peripheral outline of said subdivision, followed by treating its inside area.

6. The treatment method according to claim 1, wherein, during step b), the position of the treatment device relative to the surface for treatment is determined and monitored.

7. The treatment method according to claim 1, wherein the treatment of a surface for treatment comprises at least one of painting said surface for treatment, sanding said surface for treatment, and spraying a plaster coating on said surface for treatment.

8. The treatment method according to claim 1, wherein the surface for treatment comprises one or more walls, one or more facades, one or more ceilings, and/or one or more floors.

9. The treatment method according to claim 1, wherein the surface for treatment is an inside surface in a building.

10. The treatment method according to claim 1, performed in industrial and automated manner, in which the method also includes a step of searching for and/or identifying each new surface for treatment, prior to step a).

11. The treatment method according to claim 9, wherein the inside surface is in a house, in an apartment building, or in an office building.

12. The treatment method according to claim 1, wherein the automaton also comprises an optical locating system enabling the automaton to position itself in its surroundings.

13. The treatment method according to claim 1, wherein the automaton is compact so as to go through doors and to use an elevator.

14. The treatment method according to claim 1, wherein the automaton presents a height that is less than or equal to 2.5 meters, a width that is less than or equal to 2 meters, and a length that is less than or equal to 4 meters.

* * * * *